US008824280B2

(12) United States Patent
Huang

(10) Patent No.: US 8,824,280 B2
(45) Date of Patent: Sep. 2, 2014

(54) METHOD AND ARRANGEMENT FOR ENABLING LINK STATUS PROPAGATION

(75) Inventor: Wei-Ping Huang, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 28 days.

(21) Appl. No.: 13/381,893

(22) PCT Filed: Jun. 17, 2010

(86) PCT No.: PCT/SE2010/050681
§ 371 (c)(1),
(2), (4) Date: Dec. 30, 2011

(87) PCT Pub. No.: WO2011/002398
PCT Pub. Date: Jan. 6, 2011

(65) Prior Publication Data
US 2012/0099427 A1    Apr. 26, 2012

Related U.S. Application Data

(60) Provisional application No. 61/230,249, filed on Jul. 31, 2009, provisional application No. 61/221,781, filed on Jun. 30, 2009.

(51) Int. Cl.
H04L 12/26    (2006.01)
H04L 12/56    (2006.01)

(52) U.S. Cl.
CPC ..................... *H04L 45/28* (2013.01)
USPC ......................................... 370/228

(58) Field of Classification Search
CPC ..................................... H04L 45/28
USPC ........................ 370/225, 228, 466; 709/223
See application file for complete search history.

(56) References Cited

U.S. PATENT DOCUMENTS 7,468,944 B2 * 12/2008 Nishioka et al. .............. 370/225
7,969,866 B2    6/2011 Khan et al.
(Continued)

FOREIGN PATENT DOCUMENTS

EP    1263166 A2    12/2002
EP    1282265 A2    2/2003
(Continued)

OTHER PUBLICATIONS

International Search Report, Application No. PCT/SE2010/050681, dated Oct. 7, 2010, 3 pages.
First Office Action, CN Application No. 201080029959.8, dated Mar. 28, 2014, 10 pages.

Primary Examiner — Hassan Kizou
Assistant Examiner — Abdullahi Ahmed
(74) Attorney, Agent, or Firm — Blakely Sokoloff Taylor & Zafman LLP

(57) ABSTRACT

A system and method for implementation of a process that propagates a link status across a media converter system implemented in a telecom and/or data com network is provided. More specifically, the system comprise XAUI and PMA/PMD interfaces that support both a copper cable and the different types of SFP+/SFP fiber-optic pluggable modules for accessing a host system and a remote link partner, respectively. With the method, the link statuses at both the copper and fiber-optic link sides of the media converter system are being monitored, such that a change of link status at one side of the media converter system will automatically be propagated across the media converter system to the other side, by dynamically enabling or disabling a respective XAUI or PMD transmitter at the opposite side of a physical layer device (PHY) of the media converter system.

21 Claims, 5 Drawing Sheets

(56) References Cited

U.S. PATENT DOCUMENTS

| | | |
|---|---|---|
| 8,064,338 B2 | 11/2011 | Kini et al. |
| 2005/0060394 A1* | 3/2005 | Frechette et al. ............. 709/223 |
| 2009/0022176 A1* | 1/2009 | Nguyen ........................ 370/466 |
| 2009/0161533 A1 | 6/2009 | Ballantyne et al. |

FOREIGN PATENT DOCUMENTS

| | | |
|---|---|---|
| GB | 2233851 A | 1/1991 |
| WO | 9905802 A1 | 2/1999 |

* cited by examiner

METHOD AND ARRANGEMENT FOR ENABLING LINK STATUS PROPAGATION

CROSS-REFERENCE TO RELATED APPLICATIONS

This application is a National stage of International Application No. PCT/SE2010/050681, filed Jun. 17, 2010, which claims the benefit of U.S. Provisional Patent Application 61/221,781, filed Jun. 30, 2009 and U.S. Provisional Patent Application 61/230,249, filed Jul. 31, 2009, which are hereby incorporated by reference.

TECHNICAL FIELD

The present invention relates generally to a method and an arrangement for enabling link status propagation in a network configuration comprising an IP transport network interconnected to an IP based host system.

BACKGROUND

Due to its proven low implementation cost, reliability, and relative simplicity of installation and maintenance, Ethernet's popularity has grown to the point that nearly all data traffic on the Internet originates or terminates with an Ethernet connection. With increasing demands of data rates, 10 Gigabit Ethernet, normally referred to as 10 GbE, nowadays becomes the natural evolution and the widely adopted technology both in telecommunication and data communication networks.

A study group established with IEEE802.3 specifies the standards used for 10 GbE. One of the most interesting 10GbE standards refer to 10GBASE-CX4 (IEEE802.3ak) that specifies a physical layer device (PHY) for providing 10 Gb/s over 4-lane copper cables, i.e. the so-called CX4 cable, which is similar to the corresponding varieties used in the known InfiniBand™ and DensiShield™ technologies. The introduction of 10GBASE-CX4 gains its popularity for use in data communication networks mainly due to advantages of low per-port cost, low power consumption and low latency.

FIG. 1 is a simplified schematic overview exemplifying a conventional network configuration comprising an IP based host system 100 which is interconnected with an IP transport network 102 via two separate lines, namely a working line, comprising a first pair of link paths 105a/105b, and a protecting line, comprising a second pair of link paths 105a'/105b', where the protecting line has a main purpose of providing for redundancy in the network configuration.

For providing both lines and equipment protection, two switches 101a,101a', typically 10GbE switches, belonging to the host system is connected to its remote link partner, i.e. IP transport network 102, for the link path redundancy, via a respective router 103a,130a', typically a 10GbE router. Here, one pairing of a switch and router is used for the working line 105a/105b and the other pair is used for the protection line 105a'/105b', respectively. If a link failure occurs in the working line, the redundancy protection systems used by any of the IP based host system 100 and the IP transport network 102 will switch traffic from the failing working line to the protection line, or vice versa if the failing working line is recovered.

The 10GBASE-CX4 protocol which is a typical protocol for supporting an interconnection e.g. via a CX4 cable, specifies a maximum working distance which is limited to 15 m only. Such a limited working distance makes it difficultly to cover the basic demand in the telecom network, which typically ranges from a 200 m working distance for interconnecting applications up to a working distance of a few tens of km for long-haul applications. In order to reach a desired working distance, a media converter system, or more specifically a 10GbE media converter system, is needed for the 10GBASE-CX4 based host system to connect the remote link partner.

In order to meet the requirements of longer operating distances a new solution for the system described above with reference to FIG. 1 will be needed. FIG. 2 is another simplified schematic overview, exemplifying an alternative network configuration where two media converter systems, such as e.g. 10GbE media converter systems, have been deployed into the link paths between the switches 101a,101a' and the routers 103a,103a' for the main purpose of increasing the operating link distance. With the help of media converter systems, a link distance up to 40,000 m can be achieved.

The media converter system typically converts a copper-based formatted signal, i.e. 10GBASE-CX4, into fiber-optic based formatted signals, such as e.g. 10GBASE-SR/ -IR/ -ER specified by IEEE802.3ae, or 10GBASE-IRM specified by IEEE802.3aq. Since the media converter system only works at the physical network layer, it makes the whole conversion process transparent to the higher layer network devices, e.g. the Ethernet switches, which imply that it will not introduce any interference with higher layer functions in the network.

A media converter may e.g. be used for supporting a special application where the system of the remote link partner, e.g. a 1GbE switch, is designed to run a low data rate with the fiber-optic based 1000Base-X protocol. With the help of a SFP1000Base-ZX transceiver module and Single mode optical fibers (SMF), it may even be possible for a 10GbE media converter system to support data traffic over an 80,000 m transmission distance.

For a modern 10GbE media converter system, it is designed to support the fiber-optic based pluggable transceiver modules. The well-known fiber-optic based pluggable transceivers for 10GbE applications include the various types known as e.g. XENPAK, XPAK, X2, XFP and SFP+. With the help of these modules, multiple protocols, such as e.g. 10GBASE-SR/ -IR/ -ER/ -IRM can be supported by the same 10GbE media converter system, by exchanging the pluggable transceiver that is operated using the specific protocol specified by both the host system and its remote link partner.

Due to the similarity of mechanical construction, the same 10GbE media converter system designed for SFP+ pluggable transceiver module may also be used to support fiber-optic based and/or copper-cable based SFP pluggable transceiver modules that run formatted signals with lower data rate protocols, such as e.g. 1000Base-SX/ -IX/ -ZX specified by IEEE802.3z or 1000Base-T specified by IEEE802.3ab, respectively. For the 10GbE media converter system, the operating mode supporting SFP pluggable transceiver modules often refers to the so-called 1GbE bypass mode.

The 10GbE media converter is usually designed to have at least one channel including a par of ports, one port for connecting the CX4 copper cable to set up the link with the host system and the other one designed to support the fiber-optic based pluggable transceiver module to be connected to the remote link partner, respectively. By carefully selecting the pluggable transceiver modules and different types of the fibers, e.g. multimode fiber (MMF), or single mode fiber (SMF), a link distance from a few tens of meters up to 40000 meters can be achieved.

It is well-known practice to use a redundant system for the duplication of a critical link in a network such as the one described in FIG. 1 to ensure the network connectivity and reliability. In practice, the link protection is done by using at least two link lines, i.e. an active line, or working line, and a standby line, or a protecting line. If the link supported by the working line fails, the change of link status will normally be simultaneously notified by the redundant systems of both link partners at both ends of the link path, thus the redundant system of both link partners will simultaneously switch the data traffic onto the protecting line within typically a few tens of ms up to a few hundreds of ms. In such a way, network connectivity can be maintained and protected within the network configuration.

However, after introducing a media converter system in the link path of a network such as the one described in FIG. 2, the network connectivity may not be guaranteed anymore. This is because the media converter system creates an interconnecting node inside the link path, meaning that if a link failure occurs at one side of media converter system, such as e.g. at the fiber-optic link path side, the opposite link of media converter system, i.e. the side of copper link path, may still be set-up properly. Thus, the redundancy systems of both link partners will not be triggered to simultaneously switch the data traffic onto the protecting line, which will most likely lead to the complete loss of data traffic in the network. Thus, there are reasons to address the problem of network connectivity caused by the introduction of an interconnecting node.

SUMMARY

The object of the present document is to address the problems outlined above. In particular, it is an object of the present document to provide a solution that enables link status to propagate in a network configuration comprising an IP transport network interconnected to an IP based host system, without requiring any user interaction.

These objects and others may be obtained by using the method and arrangement according to the attached independent claims.

According to one aspect a method of supporting link status propagation in a network configuration, comprising a media converter system interconnecting an IP based host system with an IP based transport network is provided. The method is executable in a network configuration where the IP based host system is connected to the media converter system via a first pair of link paths and the IP based transport network is connected to the media converter system via a second pair of link paths. According to one exemplary embodiment a link status change at one of the link paths is automatically propagated across the media converter system to the opposite link path by enabling a corresponding transmitter (PMD-TX; XAUI-TX) in case it is disabled, or by disabling a corresponding transmitter (PMD-TX; XAUI-TX) in case it is enabled.

An advantage with applying the suggested method is thus that a link status change will be propagated across a media converter system without requiring any manual user interaction.

More specifically, the suggested method may include a monitoring of respective link statuses of the first and the second pair of link paths in order to register link status changes, of disabling the corresponding transmitter (PMD-TX,XAUI-TX) in case it is enabled and in case a link status change to a loss of link (LOL) status of the link paths is recognized during the monitoring, and of enabling the corresponding transmitter (XAUI-TX; PMD-TX) in case it is disabled and in case a link status change from a LOL status of one of the link paths is recognized during the monitoring.

The monitoring step may typically comprise a monitoring of transmitter link status registers of a physical layer device (PHY) of the media converter system 104;104'. Furthermore, the enabling/disabling steps may comprise a further step of updating an alarm signal list according to a monitored link status change, such that updated alarm information on the executed enabling or disabling step can be accessed whenever needed. More specifically, an alarm signal indicating a monitored link status change to a LOL status may be sent to a local & remote management interface 311 of the media converter system in case at least one of the mentioned transmitters has been disabled.

The network configuration at which the suggested method is to be executed typically comprises two parallel lines, thereby providing redundancy to the network, where each line comprises a first pair of link paths and a second pair of link paths. In such a scenario the method may comprise the further step of switching from a first pair of link paths and a corresponding second pair of link paths of one of the lines to the first and the second pair of link paths of the other line in response to recognizing an alarm signal indicating a link status change to the LOL status.

The media converter system is typically supporting a plurality of channels, N channels, and wherein the method steps mentioned above are executable on a per channel basis for each of the N channels, according to pre-defined settings. Typically such a process is executable at least upon each booting or rebooting the media converter system.

According to another aspect an arrangement provided in a media converter system where the arrangement is configured to execute the method described above is also provided. The arrangement is provided with a process controlling function which is configured to enable for a link status change occurring at one of the link paths to automatically propagate across the media converter system to the opposite link path by instructing an enabling/disabling function to enable a corresponding transmitter (PMD-TX;XAUI-TX) in case it is disabled, or to disable a corresponding transmitter (PMD-TX; XAUI-TX) in case it is enabled, in response to recognizing that the link status change has occurred.

The arrangement typically further comprise a monitoring function configured to monitor a respective link status of the first and the second pair of link paths, such that link status changes can be recognized, wherein the enabling/disabling function is configured to disable the corresponding transmitter (PMD-TX;XAUI-TX) in case it is enabled, in response to being notified by the monitoring function of a link status change to a loss of link (LOL) status, and to enable the corresponding transmitter (PMD-TX;XAUI-TX) in case it is disabled, in response to being notified by the monitoring function of a link status change from a LOL status. The monitoring function is typically configured to execute the monitoring in real-time.

The arrangement is also typically provided with receiver link status registers, wherein the monitoring function is configured to execute the monitoring steps by monitoring the respective receiver (PMD-RX;XAUI-RX) link status registers of a PHY of the media converter system.

The arrangement may also be provided with an alarm generating function configured to update an alarm signal list according to a monitored link status change recognized by the monitoring function. More specifically, the alarm generating function may be configured to forward an alarm signal indicating a monitored link status change to a LOL status to a local & remote management interface of the media converter system in response to being notified of such a link status change by the monitoring function.

Typically the process control function is adapted to configure N channels and to manage execution of the functional steps described above on a per channel basis for each of the N channels according to pre-defined settings. According to one embodiment, the pre-defined settings are set such that the process control function manages execution of the functional steps described above at least upon booting or rebooting of the media converter system.

The arrangement suggested above is typically also configured as a redundant system, wherein the network configuration is provided with two parallel lines, where each line comprises a first pair of link paths and a second pair of link paths, and wherein the process controlling function is further configured to switch from a first pair of link paths and a corresponding second pair of link paths of one of the lines to the first and second pair of link paths of the other line in response to recognizing an alarm signal indicating a link status change to the LOLstatus.

According to one exemplary embodiment the process control function is adapted to manage a media converter system which has been configured as a 10GbE media converter system. If such a media converter system is used the transport media used for the second pair of link paths may be provided with optical fibers which are supported by an optic SPF+ pluggable module via the PMD interface.

According to another exemplary embodiment the process control function is instead adapted to manage a media converter system which is configured as a 1GbE media converter system. If such a media converter system is used the transport media used for the second pair of link paths may instead be provided with optical fibers which are supported by an optic SPF pluggable module and/or an optic SPF+ pluggable module via the PMD interface. In case the optical fibers are supported by an optical SPF+ pluggable module, the 10GbE media converter system may be configured to operate at any of a limiting mode supporting one or more SFP+ 10GBASE-SR/ IR/ ER type pluggable modules, and a linear mode supporting one or more SFP+ 10GBASEd-IRM type pluggable modules.

According to another alternative embodiment, the process control function may be adapted to manage a media converter system which is configured as a 1GbE media converter system. In the latter case, the transport media used for the second pair of link paths may be provided with optical fibers which are supported by an optic SPF pluggable module via the PMD interface. More specifically, the transport media used for the second pair of link paths may be provided with CAT5 or CAT6 copper cables which are supported by a 1000Base-T pluggable module via the PMD interface. The 1GbE media converter system may be configured to operate at any of a forced 1GbE bypass mode supporting one or more SFP 1000 Gbase-SX/ IX10/ IX40/ ZX type pluggable modules, and an auto negotiation 1GbE bypass mode supporting a 1000Base-T pluggable module.

The transport media used for the first pair of link paths in any of the embodiments described above may comprise CX4 copper cables which are supported by the XAUI interface.

Further features of the methods and arrangements and its benefits suggested above can be understood from the detailed description following below.

BRIEF DESCRIPTION OF THE DRAWINGS

The invention will now be described in more detail by way of exemplary embodiments and with reference to the accompanying drawings, in which.

DETAILED DESCRIPTION

Figure 1:
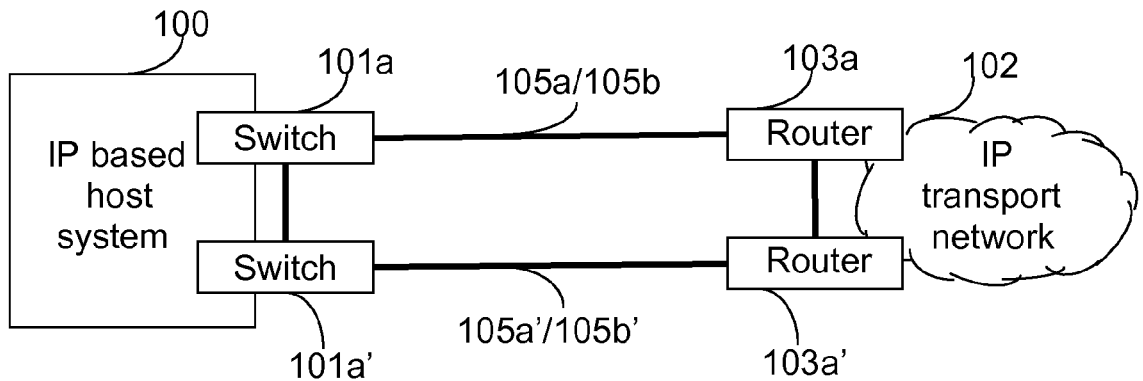
FIG. 1 is a schematic overview of a network configuration comprising an IP based host system which is interconnected with an IP transport network, according to the prior art.
Figure 2:
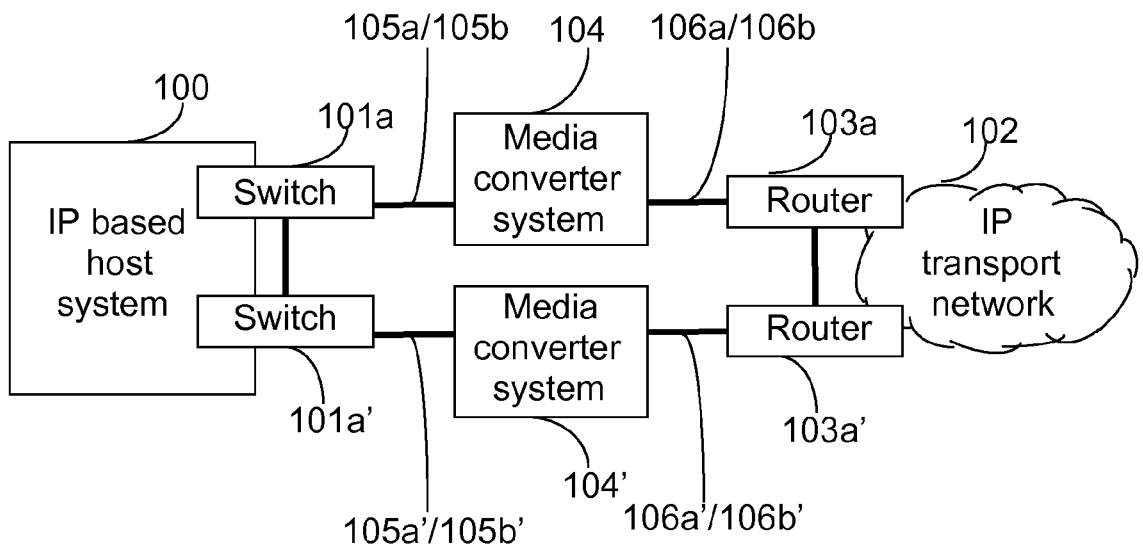
FIG. 2 is a schematic overview of another network configuration comprising media converter systems for the purpose of enabling for longer operating distances.

The present document refers to a method for enabling link status propagation also in a network configuration which is provided with a media converter system, and an arrangement configured to execute the suggested method.

A typical media converter system, such as e.g. a 10GbE media converter system, will now be described in more detail with reference to FIG. 3.

A key component used by the media converter system is the physical layer device 319, from hereinafter referred to as the PHY, which is typically a single-chip device with a multiple sub-layer construction that follows the design requirements specified by IEEE802.3. For supporting the data traffic through the fiber-optic link path, a number of multiple sub-layers are needed. These sub layers mainly consist of the sub-layer of Physical Media Dependent (PMD) with a par of transmitter, PMD-TX, and receiver, PMD-RX, the Physical Medium Attachment (PMA) sub-layer, and the 64B/ 66B Physical Coding Sub layer (PCS) 304. On the other hand, the sub-layers needed for supporting the data traffic through a CX4 copper link path mainly include the 8B/10B PCS, the 10 gigabit media independent interface (XGMII), the optional XGMII Extender Sub-layer (XGXS), the 10 gigabit attachment unit interface (XAUI) with 4 pars of transmitters, XAUI-TX and receivers, XAUI-RX. As an example of hardware design, the media converter system provides both a XAUI interface 300 and a PMD interface 308, wherein the latter can be connected to the CX4 copper cable and SFP+/ SFP fiber-optic pluggable transceiver modules 107.

The XAUI TX and XAUI RX sub-layers provide electrical functionality for transmission and reception of 4-channel serial data, typically running at the speed of 3.125 Gbps. These sub-layers include various functional component, such as e.g. clock multiplication, data serialization/ de-serialization, clock data recovery, signal amplification and differential signal driving.

The PMD TX and PMD RX sub-layers typically also provide electrical functionality for transmission and reception of 10 gigabit serial data running at the speed of 10.3125 Gbps. These sub-layers also include various functional component such as e.g. clock multiplication, data serialization/ de-serialization, clock data recovery, signal amplification and differential signal driving. The receiver equalization at the PMD RX sub-layer may also have a built-in electric dispersion compensation (EDC) function 307, which makes it possible for the PHY, 319 not only to optimize the limiting mode with e.g. 10GBASE-SR/ -IR/ -ER protocols but also to support the linear mode running e.g. at the 10GBASE-IRM protocol.

A XGXS PCS sub-layer 303 is responsible for coding and decoding data that will be transmitted and received on the XAUI TX and XAUI RX. This functionality typically includes 8B/10B encoding or decoding, randomizing and lane alignment. While, the PMD/PMA PCS sub-layer 304 is responsible for coding and decoding data that will be transmitted and received on the PMD side. The functionality includes data scrambling/ descrambling, 64B/ 66B encoding or decoding, data transitioning, synchronization, multiplexing and phase detecting, while a built-in clock multiplication unit (CLM) (not shown) can be used for achieving retiming of the XUAI TX and the PMD TX. An additional first-in-first-out (FIFO) device (not shown) is also used for 4-lane alignment and to accommodate the frequency differences of different function unit, such as e.g. the XAUI clock data recovery, the PMD clock multiplier unit and the external reference clock.

Figure 3:
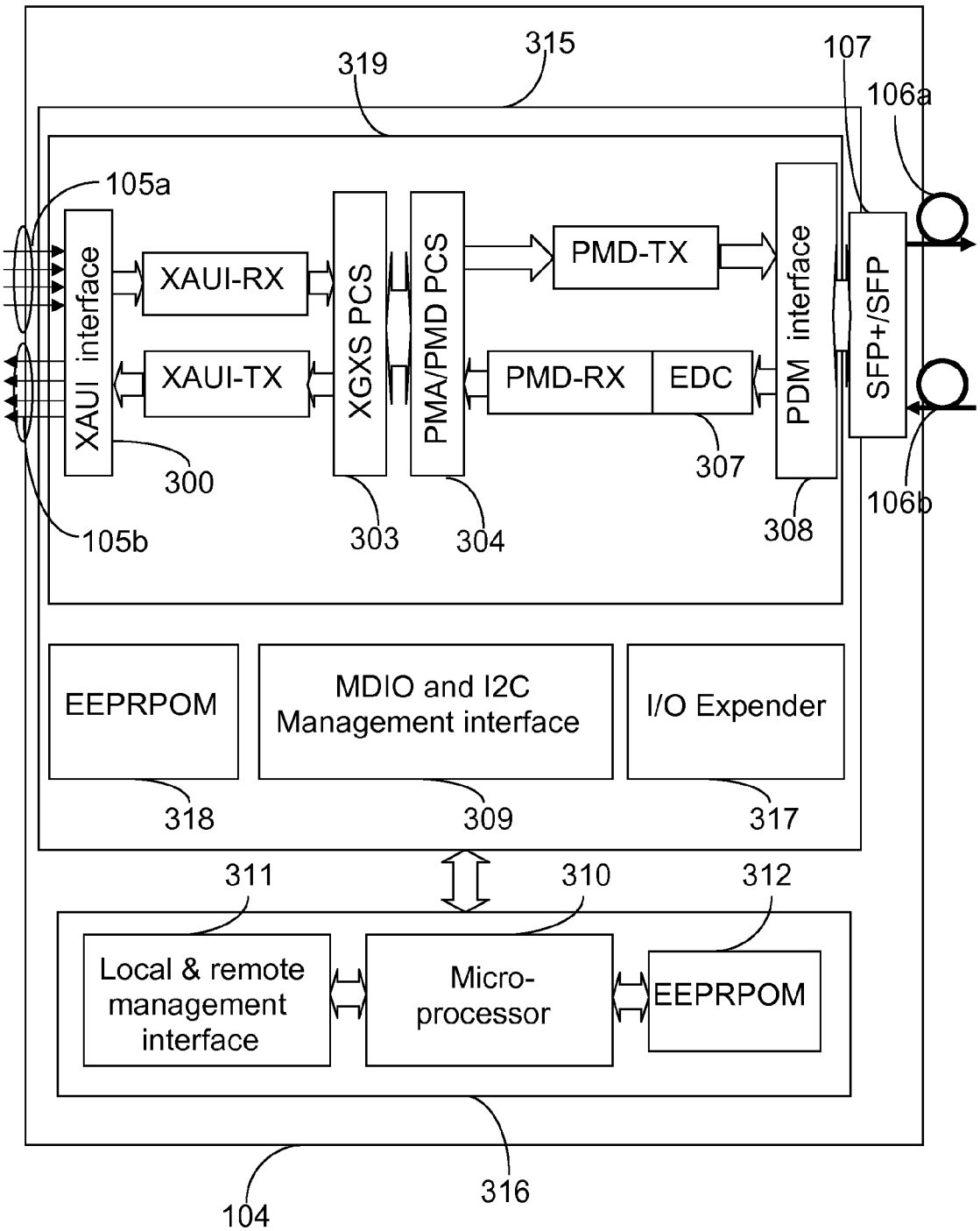
FIG. 3 is a simplified block scheme illustrating a media converter system which is configurable to execute a link status propagation process.

For supporting on-chip device configuration and control, two typical types of communication interfaces are used by the PHY device 319, i.e. the management data input/ output (MDIO) and the two-wire serial interface (I2C), which in FIG. 3 are represented by the MDIO I2C Management Interface 309 and connected to a micro-processor 310. The I2C interface enables the extraction of identity information that is stored in a built-in EEPROM (not shown) of a SFP+/ SFP pluggable module 107 In addition the I2C interface also provide the microprocessor 316 access to an on-board memory device, to EEPROM 318 and to the I/O expender 317. The MDIO interface is mainly used for communication between the microprocessor 310 and the PHY 319. EEPROM 318 is mainly used to store inventory data, such as e.g. manufacturing information and device configurations.

An Electrically Erasable Programmable Read Only Memory (EEPROM) 312, accessible to the micro-processor 310 is used for installation of required firmware. Although not shown in the figure, a local & remote interface 311 is attached to the micro-process 310, for support of various tasks, such as e.g. alarm handling and firmware upgrading. The media converter system 104 also comprises a conventional power supply (not shown).

The data flows for bidirectional transmission which can transverse through the media converter system could be summarized as following. At one of the transmit paths, XAUI RX collects 4-lane 3.125 Gbps data at the XAUI Interface 300 via a lane of CX4 cable and reforms the data for 10.3215 Gbps serial transmission at the PMD sub-layer. On the other hand, the PMD RX accepts 10.3125 Gbps serial PMD data at the PDM interface 308 via SFP+/SFP 107 and reforms the data for transmission on 3.125 Gbps 4-lane XAUI TX.

The introduction of EDC 307 is to overcome a strong fiber-dependence in the use of the 10GBASE-SR protocol, the so-called differential mode delay (DMD). The DMD is caused by the difference in the effective velocity of the different fiber modes caused by imperfections in the index profiles of the fibers. Because of DMD, the conventional 10 Gbps serial transmission over legacy multimode fibers (MMF) is severely limited. For instance, the 10GBASE-SR based optical modules support only 26 m of MMF with the modal bandwidth of 160/500 MHz.km, i.e. the so-called FDDI-grade type, 33 m of MMF with the modal bandwidth of 200/500 MHz.km, i.e. the so-called OM1 type, 82 m of MMF with the modal bandwidth of 500/500 MHz.km, i.e. the so-called OM2 type, and 300 m of MMF with the modal bandwidth of 1500/500, i.e. the so-called OM3 type, respectively. The problem becomes more complex because the DMD can also vary with time due to fiber movement, temperature variation and other effects that change the optical power distribution across the mode group.

The MDIO management interface 309 specified by IEEE802.3 clause 45 provides a simple serial management interface between the PHY 319 and the external micro-processor 310. With the help of MDIO, the status of all MDIO manageable devices (MMD) built in different sub-layers of PHY 319 can be accessed, monitored and controlled by the micro-processor 310. For example, the MMD device addresses 1, 3 and 4 are well-specified to the PMD, PCS and XAUI sub-layers in clause 45, respectively. For each device, a number of 16-bit registers can be defined for different purposes, mainly to read the device status and to execute the control and/or test functions of on-chip devices. For each bit of the register, a specific function can be assigned. It is to be understood that for getting a specific status and/or executing a specific function for the device, the combination of a number of bits from one or more devices may be used simultaneously.

For supporting a process of link status propagation, the most interesting registers would be the status registers that define the operating modes, such as e.g. the limiting, linear, the forced 1G bypass, auto-negotiation 1G bypass modes, the link status registers for both XAUI-RX and PDM-RX receivers, and the control registers for both the XAUI-TX and PDM-TX transmitters.

A process for enabling link status propagation also in a network comprising media converter systems, such as e.g. the 10GbE media converter system will now be described in more detail with reference to FIGS. 4 and 5. The suggested link status propagation process may be divided into two processes, namely a preparatory pre-process and a main-process.

Figure 4:
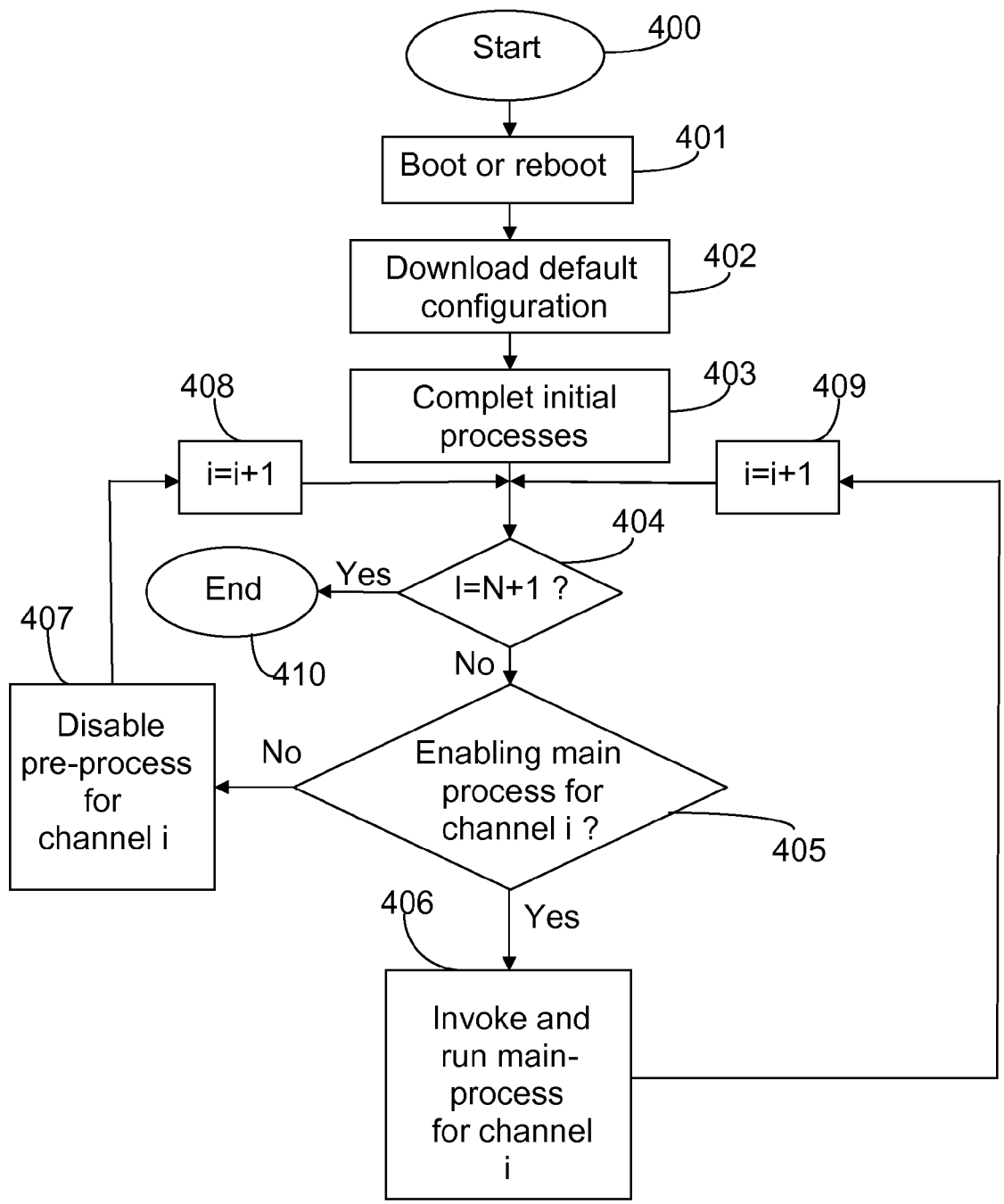
FIG. 4 is a flow chart illustrating a method, according to one exemplary embodiment, for executing a pre-process at the media converter system of FIGS. 2 and 3 for enabling successively invoking of a link status propagation processes for N channels of a line interconnecting the IP based host system with an IP transport network.

A pre-process according to one exemplary embodiment is illustrated with the flow chart of FIG. 4. The pre-process is mainly used for enabling or disabling a new process of link status propagation for an invidious channel $P_i$, where, i=1 to N, and where N is the total number of channels supported by the media converter systems. The pre-process is also used for invoking the main-process, which adapted to provide for link status propagation to support the operation of the PHY whenever required.

After starting or rebooting the media converter system as indicated in a step 401, default configurations for on-chip devices and default values for registers are downloaded to the PHY, as indicated in a next step 402, after which a number of well-defined ordinary processes, including a device initialization and a device self-test, are executed, as indicated in another step 403. Subsequent to these preparatory steps the media converter system is ready for setting up the links for both link paths which are supported by the media converter system, i.e. the CX4 copper link and fiber-optic link paths.

As indicated with steps 408, 409, 404 and 405, for each channel i, the pre-process determines if there is a need to invoke and run the link status propagation main-process according to pre-defined settings, as indicated with a step 406, or if the process shall be disabled, as indicated with another, alternative step 407. This process is repeated for all N channels, after which the pre-process is terminated, as indicated with a final step 410. Since a number of different types of PHY may be used by the same media converter system, the pre-process also check the PHY used by the each specific channel $P_i$.

Figure 5:
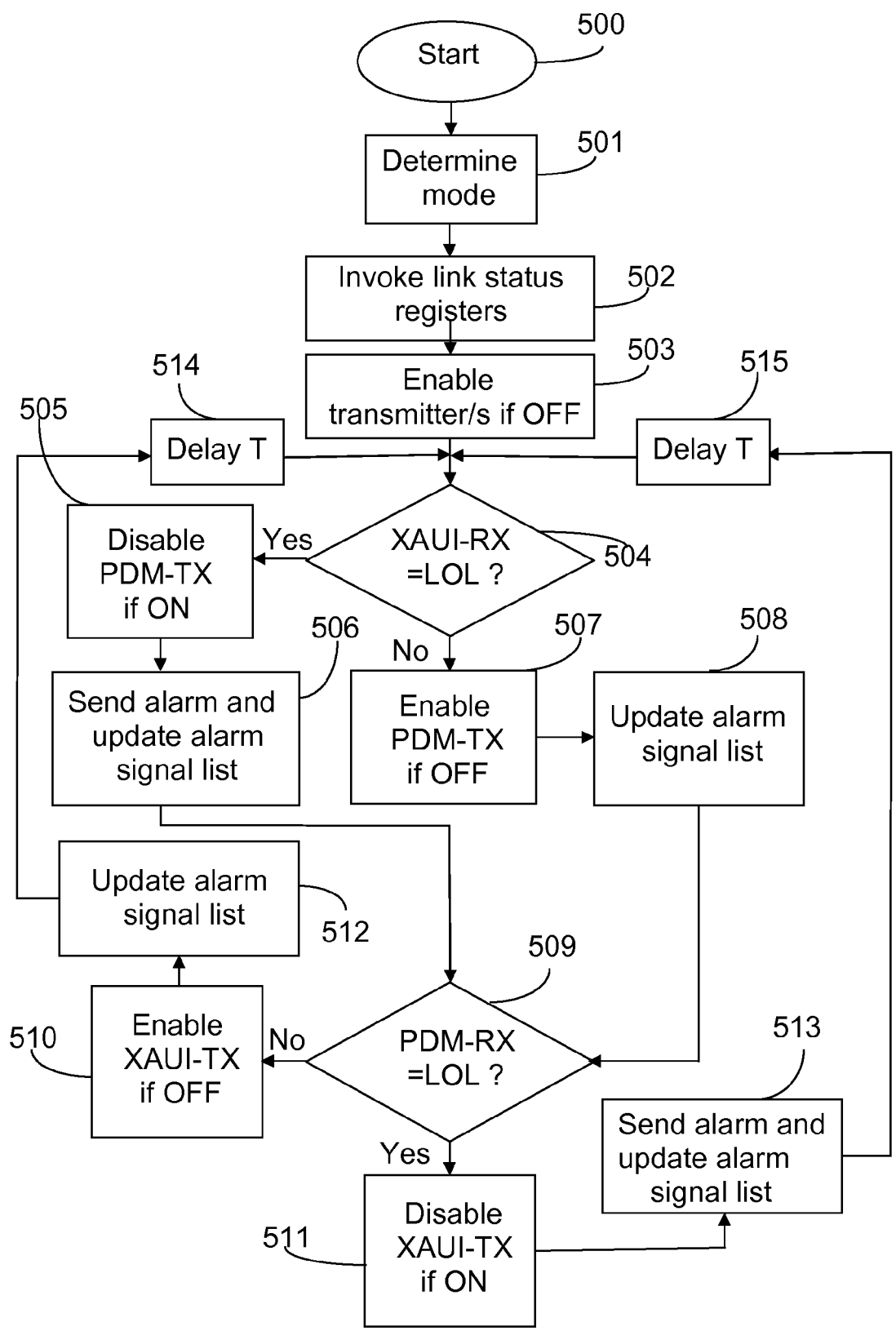
FIG. 5 is a flow chart illustrating a method for enabling execution of a status propagation process according to one exemplary embodiment.

FIG. 5 illustrates a main-process that performs a process of link status propagation across the media converter system, according to one exemplary embodiment.

The main process is initiated by determining the operating mode that is pre-defined by the operator for a channel, $P_j$, where, j=1, 2, ..., M−1, M and where M is the number of modes, as indicated with a step 501. The modes are typically accessible by interrogating a register of operating mode, as indicate with a next step 502. The main process may thus be repeatedly executed for each of the N channels.

By way of example, four different types of operating modes may be pre-defined, for a 10GbE configuration, namely the 10GbE limiting mode, the 10 GbE linear mode, the forced 1GbE bypass mode and the auto-negotiation 1GbE bypass mode.

It is to be understood that, for a specific operating mode, specific sets of status and control registers are usually defined by the vendor of the PHY. Thus, one has to invoke operating mode-dependent registers for controlling all key devices, such as e.g. $XAUI\text{-}RX_i(j)$, $PMD\text{-}RX_i(j)$ $XAUI\text{-}TX_i(j)$ and $PMD\text{-}TX_i(j)$.

For setting up both links, the transmitters of the PHY, i.e. $XAUI\text{-}TX_i(j)$ and $PMD\text{-}TX_i(j)$, have to be switched ON so that a built-in link test function can be executed. This is indicated with another step 503. In this step, the link path between the media converter system and the host system, which is typically a CX4 copper link path, as well as the fiber-optic link path of the opposite side of the media converter system are tested and the links among them are set up if no failures in the link paths have been found.

In the described embodiment, a monitoring process, which is typically configured as a real-time monitoring process, is used to monitor the link statuses for both link paths. Mowing the flow chart of FIG. 5, the process first determines the status of the CX4 copper link path by reading the $XAUI\text{-}RX_i(j)$ link status register, for channel $P_i$, as indicated with a step 504.

If a loss of link (LOL) occurs, such as the failure of CX4 cable or the failure of the transmitter of the host system, the process will turn off the $PMD\text{-}TX_i(j)$ of the PHY for the channel $P_i$ in the media converter system if it is on, as indicated with a step 505. In such a way, the link status is propagated across the media converter system toward the remote partner, and the alarm signal is also sent to the local/ remote management interfaces and the alarm signal list is also updated correspondingly, as indicated in step 506. The information of the alarm signal is stored in the EEPROM so that the alarm information can be fetched whenever it is needed. On the other hand however, if a LOL problem is instead registered in the CX copper link path, the status change of the $XAUI\text{-}RX_i(j)$ receiver will be found by the real-time monitoring process. Thus, the $PMD\text{-}TX_i(j)$ will be automatically turned ON if it is found to be off, as indicated with another step 507, and the alarm signal list will also be updated correspondingly, as indicated with a subsequent step 508.

The similar procedures will also be applied to the fiber-optic link path, such that the changes of link status will be monitored in real-time by reading the status register of $PMD\text{-}RX_i(j)$, as indicated with another step 509. According to the determined link status, the corresponding operation of switching OFF or turning ON the $XAUI\text{-}TX_i(j)$ on the mutual side of the PHY will also be taken, according to step 511 or 510, respectively. Subsequent to an enabling of the $XAUI\text{-}TX_i(j)$, the alarm signal list is updated, as indicated with a step 512, while an alarm is sent, in addition to updating the alarm signal list, as indicated in another step 513, if the $XAUI\text{-}TX_i(j)$ is instead disabled. For speeding up the process, the status registers of $XAUI\text{-}RX_i(j)$ and $PMD\text{-}RX_i(j)$ will typically always be checked before taking the action to operate the $XAUI\text{-}TX_i(j)$ or the $PMD\text{-}TX_i(j)$ devices. The whole process will typically be carried on continuously with a time set for each iteration cycle in the order of a few ms.

It is well-known that the time for switching ON/OFF some pluggable transceiver modules which are compatible with the media converter system may be significantly longer. The operating time could for example be as long as a few hundreds of ms for an SFP1000Base-T pluggable transceiver module. Thus, for the stabilization of the process and the matching of the operating time of a module, an operating-mode dependent time delay parameter, i.e. Delay T(j), as indicated with respective steps 514 and 515 can be introduced for automatic adjustment of the time in the described iteration cycle.

Figure 6:
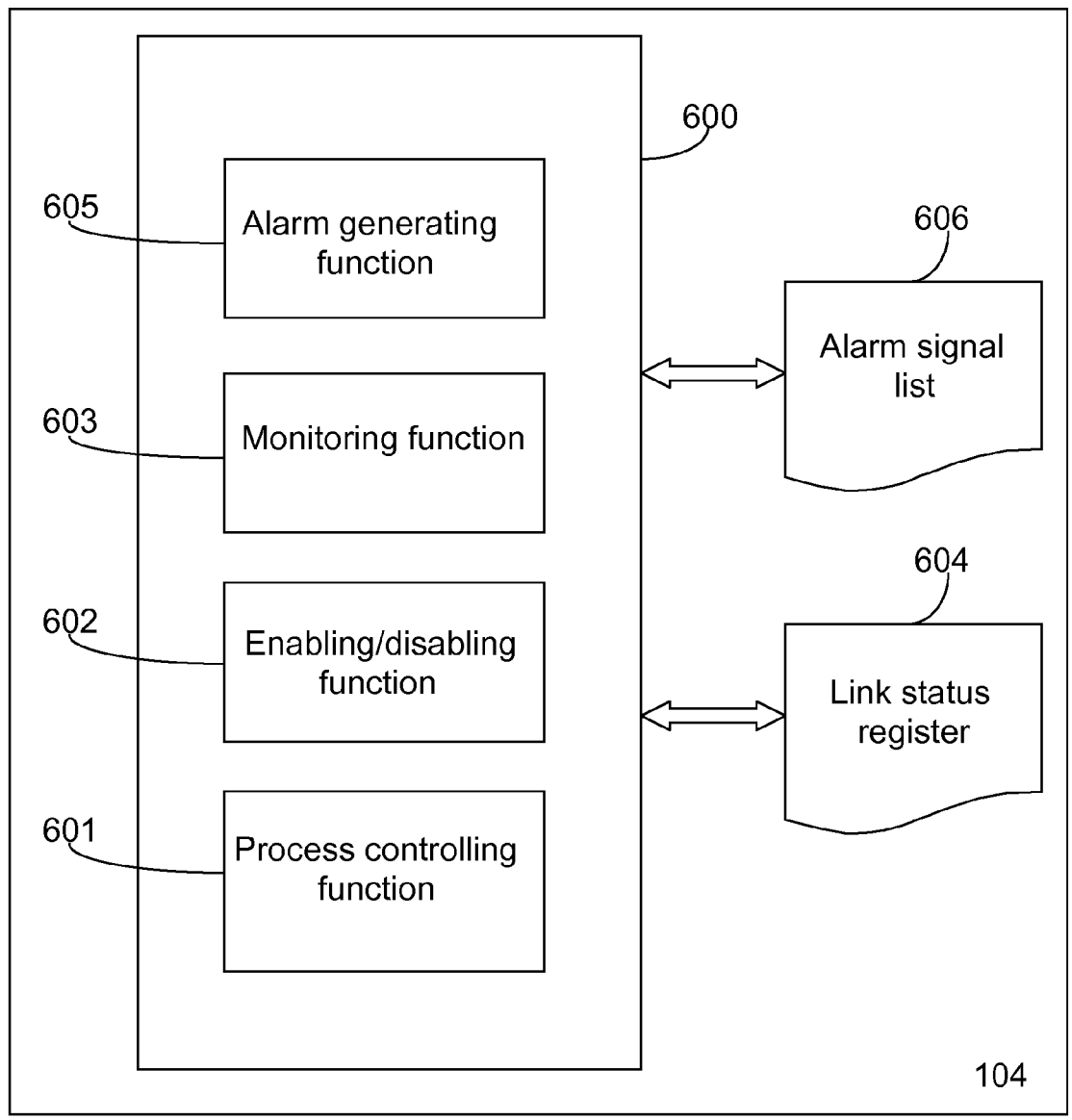
FIG. 6 is a simplified block scheme of an arrangement for implementation into a media converter system, such as the one described in FIG. 3.

An arrangement for performing a link status propagation process at a media converter system 104, 104' according to the embodiments described above may be configured according to the simplified block scheme of FIG. 6 where a media converter system 104,104' is provided with an arrangement 600 e.g. by way of adapting the micro-processor 310 of FIG. 3, or any other processing functionality arranged on the media converter system 104,104'. According to FIG. 6, the arrangement 600 is provided with a function for controlling the suggested process, which is here referred to as a process controlling function 601. The process controlling function is configured to control a link status propagation process by interacting with functionality, here implemented as an enabling/disabling function 602, which is configured to enable or disable a respective XAUI-TX or a PMD-TX transmitter whenever required. The process controlling function 601 typically controls the enabling/disabling function 602 in response to the result from a monitoring function 603, which is configured to monitor the status of the XAUI-RX and PMD-RX receivers, by monitoring relevant link status registers 604, which are accessible by the monitoring function 603. The suggested process controlling function 601 is also configured to activate an alarm generating function 605, such that an alarm can be sent, and such that an alarm signal list 606 can be updated accordingly in response to recognizing that a XAUI-TX or PMD-TX transmitter need to be enabled or disabled.

While the invention has been described with reference to specific exemplary embodiments, such as e.g. 10GbE configurations, the description is generally only intended to illustrate the inventive concept and should not be taken as limiting the scope of the invention, which is defined by the appended claims. It is to be understood that the naming and combination of functional unit is only exemplary and that other alternative combinations of functional unit which provide corresponding functionality which fall within the inventive scope of this document may be used to replace the ones used in the given examples.

ABBREVIATIONS

EDC Electric Dispersion Compensation
EEPROM Electrically Erasable Programmable Read Only Memory
FIFO First-In-First-Out
GbE Gigabyte Ethernet
I2C Two-wire serial Interface
IP Internet Protocol
LOL Loss Of Link
PHY Physical Layer Device
SMF Single Mode optical Fibers
MDIO Management Data Input/Output
MMD MDIO Manageable Device
MMF Multi Mode Fiber
PCS Physical Coding Sub-layer
PMA Physical Medium Attachment
PMD Physical Media Dependent
XGXS XGMII extender Sub-layer

The invention claimed is:

1. A method of supporting link status propagation in a network configuration comprising a media converter system interconnecting an internet protocol (IP) based host system with an IP based transport network, where the IP based host system is connected to the media converter system via a first pair of link paths and the IP based transport network is connected to the media converter system via a second pair of link paths, the method comprising:
monitoring respective link statuses of the first and the second pair of link paths in order to register link status changes, wherein the monitoring comprises monitoring a set of one or more transmitter link status registers of a physical layer device (PHY) of said media converter system; and
automatically propagating a link status change at one of said first or second pair of link paths across the media converter system to the other of said first or second pair of link paths by enabling a corresponding transmitter of the media converter system when it is disabled and disabling the corresponding transmitter of the media converter system when it is enabled, wherein said automatically propagating the link status change occurs responsive to recognizing, when monitoring the respective link statuses, a link status change to or from a loss of link (LOL) status of one of said first or second pair of link paths.

2. A method according to claim 1, wherein the enabling and the disabling each further comprise updating an alarm signal list according to a monitored link status change.

3. A method according to claim 2, further comprising sending an alarm signal indicating a monitored link status change to a LOL status to a local & remote management interface of said media converter system when at least one of said transmitters has been disabled.

4. A method according to claim 1, wherein the network configuration comprises two parallel lines, each comprising a plurality of pairs of link paths, and wherein the method further comprises switching front a first of the two parallel lines to a second of the two parallel lines in response to recognizing an alarm signal indicating a link status change to a loss of link (LOL) status.

5. A method according to claim 1, wherein said media converter system is supporting N channels and wherein said method steps are executable on a per channel basis for each of said N channels according to pre-defined settings.

6. A method according to claim 5, wherein said method steps are executable on a per channel basis for each of said N channels according to pre-defined settings upon booting or rebooting said media converter system.

7. A media converter system capable of supporting link status propagation in a network configuration, the network configuration comprising an IP based host system and an IP based transport network, wherein the media converter system is to be coupled to interconnect said IP based host system with said IP based transport network, where the IP based host system is to be connected to the media converter system via a first pair of link paths and the IP based transport network is to be connected to the media converter system via a second pair of link paths, the media converter system comprising:
receiver link status registers of a physical layer device;
monitoring function configured to monitor a respective link status of the first and the second pair of link paths via receiver link status registers such that link status changes can be recognized; and
a process controlling function configured to enable for a link status change occurring at one of said first pair or second pair of link paths to automatically propagate across the media converter system to the other of said first or second pair of link paths by instructing an enabling/disabling function to enable a corresponding transmitter of the media converter system when it is disabled and to disable the corresponding transmitter of the media converter system when it is enabled, in response to recognizing that said link status change has occurred, wherein said enabling/disabling function is configured to disable or enable said corresponding transmitter in response to being notified by said monitoring function of a link status change to or from a loss of link (LOL) status.

8. A media converter system according to claim 7, wherein the monitoring function is configured to execute said monitoring in real-time.

9. A media converter system according to claim 7, further comprising an alarm generating function configured to update an alarm signal list according to a monitored link status change recognized by the monitoring function.

10. A media converter system according to claim 9, wherein the alarm generating function is further configured to forward an alarm signal indicating a monitored link status change to a LOL status to a local remote management interface of said media converter system in response to being notified of a link status change by the monitoring function.

11. A media converter system according to claim 7, wherein the process control function is further adapted to configure N channels and to manage execution of said functional steps on a per channel basis for each of said N channels according to pre-defined settings.

12. A media converter system according to claim 11, wherein the process control function is further configured to manage execution of said functional steps upon booting or rebooting of said media converter system.

13. A media converter system according to claim 7, wherein the network configuration comprises two parallel lines, each comprising a first pair of link paths and a second pair of link paths, and wherein the process controlling function is further configured to switch from a first pair of link paths and a corresponding second pair of link paths of one of said lines to the first and second pair of link paths of the other line in response to recognizing an alarm signal indicating a link status change to the LOL status.

14. A media converter system according to claim 7, wherein the process control function is adapted to manage the media converter system which is configured as a 10 Gigabit Ethernet (10GbE) media converter system.

15. A media Converter system according to claim 14, wherein a transport media used for the second pair of link paths comprises optical fibers which are supported by an enhanced small form-factor pluggable (SFP+) optic module via a Physical Media Dependent (PMD) interlace.

16. A media converter system according to claim 15, wherein said 10GbE media converter system is configured to operate at any of: a limiting mode supporting one or more SFP+10GBASE-short reach/long reach/extended reach type pluggable modules, and a linear mode supporting one or more SFP+10Gbase-long reach multi-mode type pluggable modules.

17. A media converter system according to claim 7, wherein the process control function is adapted to manage the media converter system which is configured as a gigabit Ethernet (1GbE) media converter system.

18. A media converter system according to claim 17, wherein a transport media used for the second pair of link paths comprises optical fibers which are supported by au optic small form-factor pluggable (SFP) pluggable module via a Physical Media Dependent (PMD) interface.

19. A media converter system according to claim 17, wherein a transport media used for the second pair of link paths comprises any of Category 5 (CAT5) or Category 6 (CAT6) copper cables which are supported by a 1000Base-T pluggable module via a Physical Media Dependent (PMD) interface.

20. A media converter system according to claim 17, wherein said 1GbE media converter system is configured to operate at any of: a forced 1GbE bypass mode supporting one or more small form-factor pluggable (SFP) 1000Base-SX/LX10/LX40/ZX type pluggable modules, and an auto negotiation 1GbE bypass mode supporting a 1000Base-T pluggable module.

21. A media converter system according to claim 14, wherein a transport media used for the first pair of link paths comprises CX4 copper cables which are supported by a 10 Gigabit Attachment Unit Interface (XAUI) interface.

* * * * *

UNITED STATES PATENT AND TRADEMARK OFFICE
CERTIFICATE OF CORRECTION

PATENT NO. : 8,824,280 B2  
APPLICATION NO. : 13/381893  
DATED : September 2, 2014  
INVENTOR(S) : Huang Page 1 of 1

It is certified that error appears in the above-identified patent and that said Letters Patent is hereby corrected as shown below:

In the Specification

In Column 2, Line 53, delete "par" and insert -- pair --, therefor.

In Column 3, Line 13, delete "that" and insert -- that, --, therefor.

In Column 5, Line 31, delete "of a" and insert -- of: a --, therefor.

In Column 5, Line 45, delete "of a" and insert -- of: a --, therefor.

In Column 6, Line 50, delete "component," and insert -- components, --, therefor.

In Column 6, Line 57, delete "component" and insert -- components --, therefor.

In Column 7, Line 13, delete "unit," and insert -- units, --, therefor.

In Column 8, Line 66, delete "j=1,2,....,M-1,M" and insert -- i=1,2,....,M-1,M --, therefor.

In Column 9, Line 26, delete "Mowing" and insert -- Following --, therefor.

In Column 10, Line 44, delete "unit" and insert -- units --, therefor.

In the Claims

In Column 11, Line 39, in Claim 4, delete "front a" and insert -- from a --, therefor.

In Column 12, Line 24, in Claim 10, delete "local" and insert -- local & --, therefor.

In Column 12, Line 67, in Claim 18, delete "by au" and insert -- by an --, therefor.

Signed and Sealed this  
Fourteenth Day of July, 2015

Michelle K. Lee  
*Director of the United States Patent and Trademark Office*